United States Patent [19]

Minakuchi

[11] Patent Number: 5,801,680
[45] Date of Patent: Sep. 1, 1998

[54] INFORMATION DISPLAY APPARATUS

[75] Inventor: Mitsuru Minakuchi, Tenri, Japan

[73] Assignee: Sharp Kabushiki Kaisha, Osaka, Japan

[21] Appl. No.: 630,082

[22] Filed: Apr. 9, 1996

[30] Foreign Application Priority Data

Apr. 13, 1995 [JP] Japan .................................. 7-088364

[51] Int. Cl.$^6$ .................................................. G09G 5/02
[52] U.S. Cl. ......................... 345/150; 345/133; 340/995
[58] Field of Search ............................ 345/133, 127, 345/128, 147, 150, 72; 340/995, 990, 988; 701/200, 201, 207, 208, 211

[56] References Cited

U.S. PATENT DOCUMENTS

| | | | |
|---|---|---|---|
| 4,807,157 | 2/1989 | Fukushima et al. | 345/150 |
| 4,965,574 | 10/1990 | Fukushima et al. | 345/150 |
| 5,220,507 | 6/1993 | Kirson | 340/995 |
| 5,243,528 | 9/1993 | Lefebvre | 701/211 |

FOREIGN PATENT DOCUMENTS

| | | |
|---|---|---|
| 3-136087 | 6/1991 | Japan . |
| 5-134600 | 5/1993 | Japan . |
| 6-110941 | 4/1994 | Japan . |

*Primary Examiner*—Chanh Nguyen
*Attorney, Agent, or Firm*—Nixon & Vanderhye, P.C.

[57] ABSTRACT

The information display apparatus of this invention, includes: an information storing section for storing information to be displayed; a display section for displaying the information on a display screen; an attention point setting section for setting an attention point defining a specified point to which a user desires to direct attention on the display screen; an importance degree calculating section for calculating an importance degree of the information; a display color changing section for changing a color in which the information is displayed on the display screen in accordance with the importance degree of the information calculated by the importance degree calculating section and a distance between the information and the attention point set by the attention point setting section.

6 Claims, 10 Drawing Sheets

Information storing section

| Coordinates | Type |
|---|---|
| (x1,y1), (x2,y2) | Toll road |
| (x3,y3), (x4,y4) | National road |
| (x5,y5), (x6,y6) | Prefectural road |
| (x7,y7), (x8,y8) | Private road |
| (x9,y9) | Landmark |
| (x10,y10) | Building |
| ⋮ | ⋮ |

FIG. 3B

Importance degree storing/calculating section

| Type | Weighted value |
|---|---|
| Toll road | 100 |
| National road | 100 |
| Prefectural road | 50 |
| Private road | 10 |
| Landmark | 100 |
| Building | 10 |
| ⋮ | ⋮ |

FIG. 4

| 4.24 | 3.61 | 3.16 | 3.00 | 3.16 | 3.61 | 4.24 |
|------|------|------|------|------|------|------|
| 3.61 | 2.83 | 2.24 | 2.00 | 2.24 | 2.83 | 3.61 |
| 3.16 | 2.24 | 1.41 | 1.00 | 1.41 | 2.24 | 3.16 |
| 3.00 | 2.00 | 1.00 | 0.00 | 1.00 | 2.00 | 3.00 |
| 3.16 | 2.24 | 1.41 | 1.00 | 1.41 | 2.24 | 3.16 |
| 3.61 | 2.83 | 2.24 | 2.00 | 2.24 | 2.83 | 3.61 |
| 4.24 | 3.61 | 3.16 | 3.00 | 3.16 | 3.61 | 4.24 |

INFORMATION DISPLAY APPARATUS

BACKGROUND OF THE INVENTION

1. Field of the Invention

The present invention relates to an information display apparatus for displaying information such as a map. More particularly, the present invention relates to an information display apparatus in which the information is displayed in a detailed manner in a vicinity of the attention point whereas the information is displayed in a simplified manner in a region far from the attention point.

2. Description of the Related Art

In an information display apparatus for displaying information such as a map, a user requires detailed information in the region close to a particular attention point, such as the destination. Even if information Is located far from the attention point, but the information has a high importance degree, the information is often referred to. The information, such as a landmark on the way to the destination, may have a high importance degree. it is desirable that the user easily recognize a relationship between the detailed information in a region close to the attention point and the information as a whole.

Thus, an information display apparatus in which the information is displayed in a detailed manner within a vicinity of the attention point whereas the information is displayed in a simplified manner in a region far from the attention point is helpful for the user.

However, the conventional information display apparatus displays all information (e.g., map information) stored in a memory. Accordingly, in such an apparatus, the information is displayed in a detailed manner even in a region far from the attention point. It is therefore difficult for the user to quickly identify the necessary information among the displayed information.

In order to solve such problems, a destination-detail-type display device is proposed in Japanese Laid-Open Patent Publication No. 3-136087 (Prior Art 1).

The display device described in Prior Art 1 stores various aspects of map information which are partitioned into a plurality of layers. In displaying a map, the display device detects a region close to the attention point, displays all layers of map information inside the region, and displays only a limited number of layers of map information outside the region.

Thus, the display device described in Prior Art 1 displays detailed information inside the region close to the attention point and displays simplified information outside the region.

However, the display device described in Prior Art 1 requires judging by calculation whether or not the map information to be displayed is located inside the region close to the attention point (the attention point region) and requires calculating intersections between the map information and the attention point region in order to properly display the map information which partially overlaps the attention point region. Thus, there is a problem in that the display device requires a large amount of calculations for displaying the map information.

SUMMARY OF THE INVENTION

The information display apparatus of this invention, includes: an information storing section for storing information to be displayed; a display section for displaying the information on a display screen; an attention point setting section for setting an attention point defining a specified point to which a user desires to direct attention on the display screen; an importance degree calculating section for calculating an importance degree of the information; a display color changing section for changing a color in which the information is displayed on the display screen in accordance with the importance degree of the information calculated by the importance degree calculating section and a distance between the information and the attention point set by the attention point setting section.

In one embodiment of the present invention, the display color changing section changes the color such that the information having a lower importance degree is displayed in a more invisible manner and the information which is located farther away from the attention point is displayed in a more invisible manner.

In another embodiment of the present invention, display color changing section includes a distance calculating section for calculating a distance between the information and the attention point using a distance data table, and wherein the distance data table includes a plurality of elements each having a value indicating a distance from a center element which is located at the center of the distance data table.

In still another embodiment of the present invention, the distance calculating section calculates the distance with reference to a value of the element included in the distance data table with locating the attention point at the center element.

In still another embodiment of the present invention, the display color changing section includes color filtering section for filtering a specified color among colors displayed on the display screen.

In still another embodiment of the present invention, the color filtering section includes a central portion and a peripheral portion, the peripheral portion of the color filtering section more strongly filters the specified color compared to the central portion of the color filtering section.

The display color changing section changes a color in which the information is displayed on the display screen in accordance with the importance degree of the information calculated by the importance degree calculating section and a distance between the information and the attention point set by the attention point setting section.

This allows the map information located in a vicinity of the attention point to be displayed with a color which the user can easily recognize, and as the map information is located farther from the attention point, the map information is displayed in a color which the user can less easily recognize. The vicinity of the attention point is a region in which the distance from the attention point is smaller then a predetermined value.

This means that the vicinity of the attention point is emphasized with colors. As a result, the user can easily identify and obtain necessary information from amongst the displayed various information.

The display color changing section changes the color of the display such that the Information having a lower importance degree is displayed in a more invisible manner and the information which is located farther from the attention point is also displayed in more invisible manner.

For example, by adopting a color similar to a background color as the color for displaying map information having a low importance degree which is located far from the attention point, the map information having a lower importance degree and located farther from the attention point becomes more invisible to the human eyes.

As map information has a higher importance degree, the map information is displayed in a color including an increased amount of red component. As map information has a lower importance degree, the map information is displayed in a color including an increased amount of green component. By filtering an increased amount of green component in a peripheral portion compared to a central portion of the display screen, the map information having a lower importance degree becomes more invisible to the human yes in the peripheral portion of the display screen.

Thus, the user can easily recognize the relationship to information as a whole with reference to the detailed information in a region close to the attention point.

Thus, the invention described herein makes possible the advantages of (1) providing an information display apparatus capable of displaying detailed information inside the region close to the attention point and displaying simplified information outside the region without increasing the amount of calculations; and (2) providing an information display apparatus capable of allowing the user to easily understand the relationship to information as a whole.

These and other advantages of the present invention will become apparent to those skilled in the art upon reading and understanding the following detailed description with reference to the accompanying figures.

DESCRIPTION OF THE PREFERRED EMBODIMENTS

Hereinafter, examples of the present invention will be described with reference to the accompanying drawings.

The present invention may be adapted to various kinds of applications. For example, the present invention may be adapted to a car navigation system for displaying map information and navigating a driving course for a car.

Example 1

Figure 1:
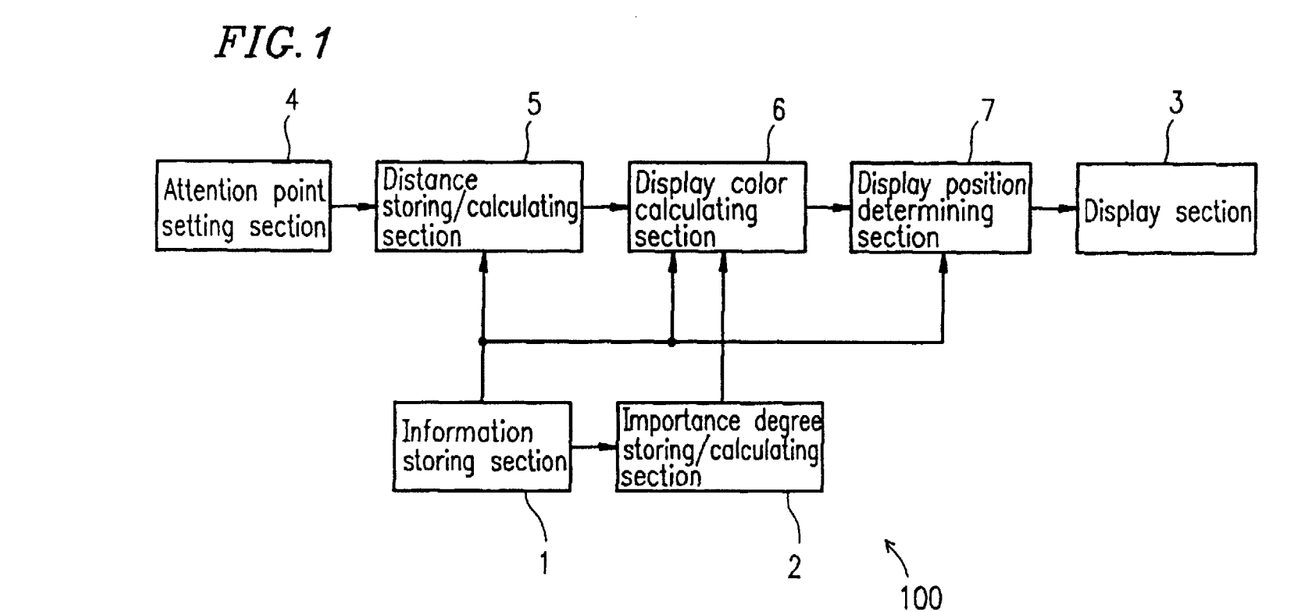
FIG. 1 is a block diagram showing a configuration for an information display apparatus 100 of Example 1 according to the present invention.

FIG. 1 shows the configuration for an Information display apparatus 100 for displaying map information of Example 1 according to the present invention.

The information display apparatus 100 includes an information storing section 1, an importance degree storing/calculating section 2; a display section 3: an attention point setting section 4, a distance storing/calculating section 5; a display color calculating section 6; and a display position determining section 7.

The information storing section 1 stores various map information to be displayed. The output of the information storing section 1 is supplied to the importance degree storing/calculating section 2, the distance storing/calculating section 5, the display color calculating section 6 and the display position determining section 7.

The importance degree storing/calculating section 2 calculates an importance degree of map Information stored in the information storing section 1. In the present specification, the importance degree of map information is defined as a degree defining how the map information is to be displayed. For example, information having a high importance degree may be displayed differently compared to information having a low importance degree. The output of the importance degree storing/calculating section 2 is supplied to the display color calculating section 6.

The display section 3 displays the map information. The display section 3 includes a display device such as a CRT or a liquid crystal display device.

The attention point setting section 4 sets an attention point in a map. In the present specification, the attention point is defined as a specified point to which a user desires to direct attention. For example, the attention point may indicate a destination to which a user wants to go. The output of the attention point setting section 4 is supplied to the distance storing/calculating section 5,.

The distance storing/calculating section 5 calculates a distance from the attention point which is set by the attention point setting section 4. The distance is a distance on a display screen of the display section 3. The output of the distance storing/calculating section 5 is supplied to the display color calculating section 6.

The display color calculating section 6 calculates a color for displaying map Information stored in the information storing section 1 in accordance with the importance degree of the map information calculated by the importance degree storing/calculating section 2 and the distance from the attention point calculated by the distance storing/calculating section 5. The display color calculating section 6 is supplied to the display position determining section 7.

The display position determining section 7 determines a position on a display screen of the display section 3 at which the map information stored in the information storing section I is to be displayed.

Figure 2:
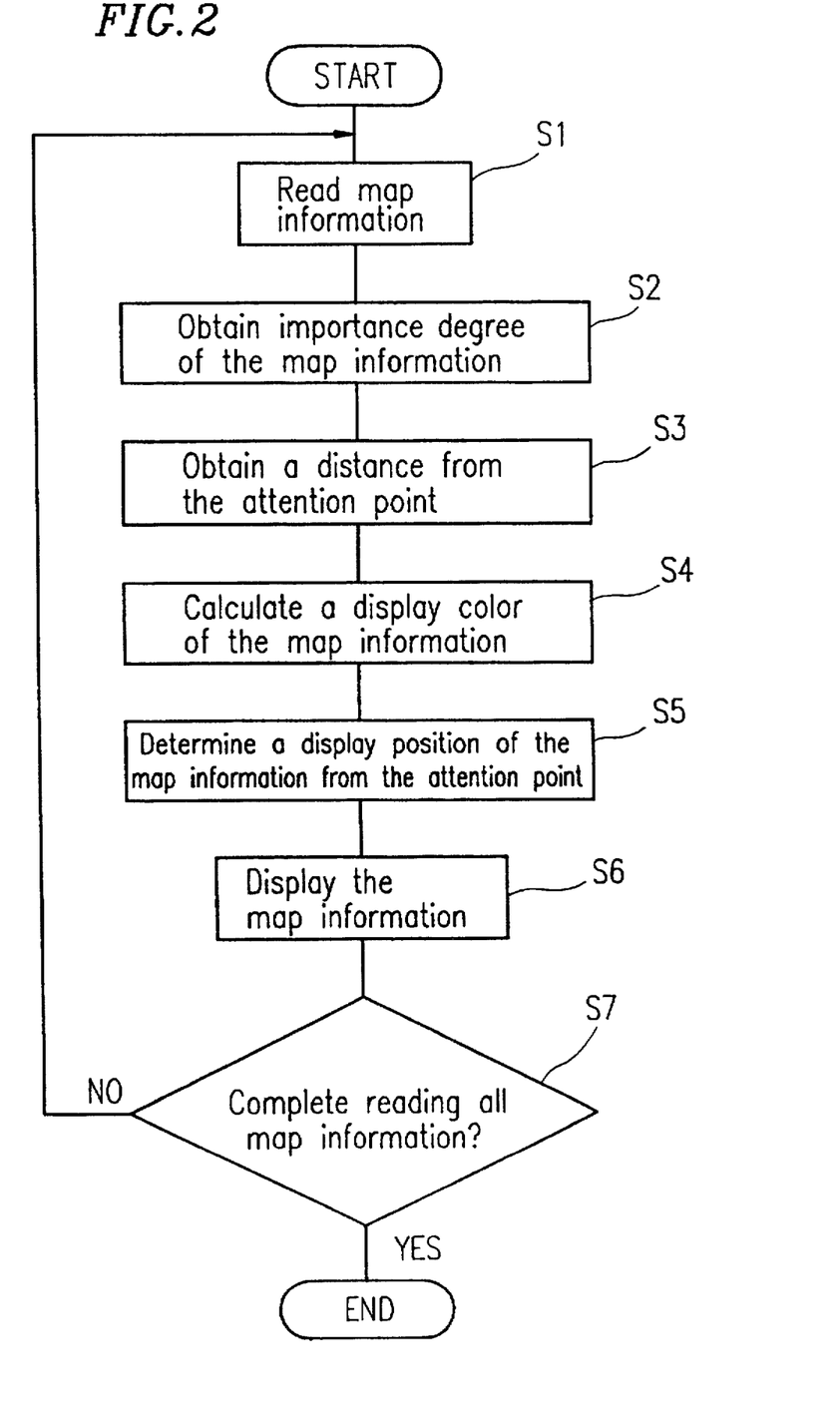
FIG. 2 is a flowchart showing the operation of the information display apparatus 100.

FIG. 2 is a flowchart showing the operation of the information display apparatus 100.

The information display apparatus 100 reads map information to be displayed from the information storing section 1 (Step S1). Read map information is supplied to the importance degree storing/calculating section 2, the distance storing/calculating section 5, the display color calculating section 6 and the display position determining section 7, respectively.

The importance degree storing/calculating section 2 obtains an importance degree of the map information which is read in Step S1, and outputs the importance degree of the map information to the display color calculating section 6 (Step S2).

The distance storing/calculating section 5 obtains a distance between the map information which is read in Step S1 and the attention point which is set by the attention point setting section 4, and outputs the distance to the display color calculating section 6 (Step S3).

The display color calculating section 6 calculates a color for displaying the map information based on the importance degree obtained by the importance degree storing/ calculating section Z and the distance obtained by the distance storing/calculating section 5, and outputs the calculated color to the display position determining section 7 (Step S4).

The display position determining section 7 determines a position on a display screen of the display section 3 at which the map information read from the information storing section 1 is to be displayed (Step S5), and displays the map information on the display screen of the display section 3 in the color calculated by the display color calculating section 6 (Step S6).

The process of Step S1 through Step S6 is repeatedly made for all map Information (Step S7).

Thus individual information is displayed on the display screen of the display section 3 with colors which may differ depending on the importance degree and the distance from the attention point.

Figure 3A:
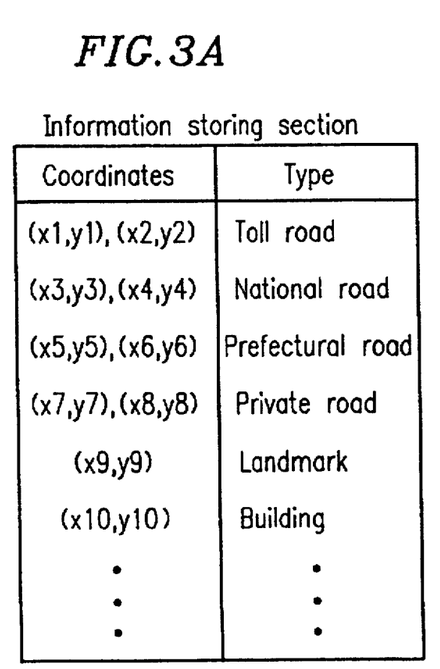
FIG. 3A is a view showing data of map information stored in the information storing section 1.
Figure 3B:
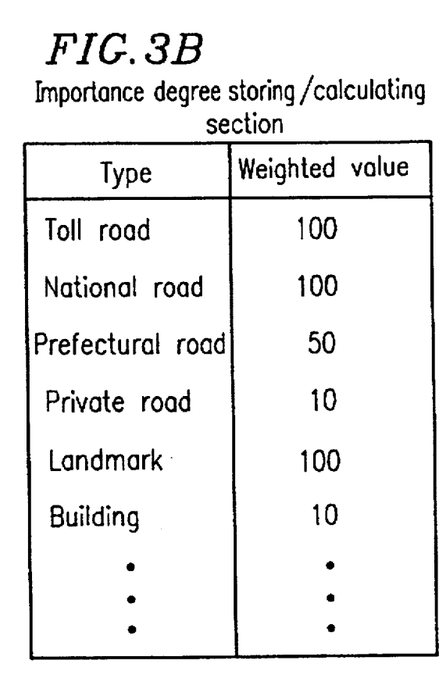
FIG. 3B is a view showing data of the importance degree stored in the importance degree storing/calculating section 2.

FIGS. 3A and 3B show an example as to how the importance degree storing/calculating section 2 obtains an importance degree of the map information stored in the information storing section 1 in Step S2.

As shown in FIG. 3A, individual map information is stored in the information storing section 1. The individual pieces of map information has two dimensional coordinates end a type. The type refers to the general classification of a particular piece of information.

As shown in FIG. 3B, a type of the map information and a value of the importance degree are stored in the importance degree storing/calculating section 2. The value of importance degree is weighted in accordance with the type of the map information. For example, the value of importance degree is weighed from 10 to 100 by units of 10.In the example shown in FIG. 3B, main roads and landmarks (i.e., marked buildings) have a high importance degree, for example, 100.

The importance degree storing/calculating section 2 obtains the importance degree of the map information stored in the information storing section 1 with reference of the type of the map information as a matching key.

When the type of the map information is not stored in the information storing section 1, any attribute of the map information may be used as a matching key instead of the type of the map information. For example, the importance degree storing/calculating section 2 may calculate the importance degree of the map information based on a width of the road or a size of the building included in the map information. In this case, it is necessary to store data indicating the width of main road and date indicating the size of a building in the information storing section 1.

The calculation of the importance degree of the map information based on inputs from a user and/or the modification of the calculated result by the importance degree storing/calculating section 2 improves easy-use of the system. For example, when a user inputs a destination to which the user wants to go, the importance degree storing/ calculating section 2 may be configured so as to obtain a higher importance degree of map information corresponding to the destination. Alternatively, when a user selects the type of roads and the type of buildings, the importance degree storing/calculating section 2 may be configured so as to obtain a higher importance degree of map information having the selected type of roads and buildings.

Figure 4:
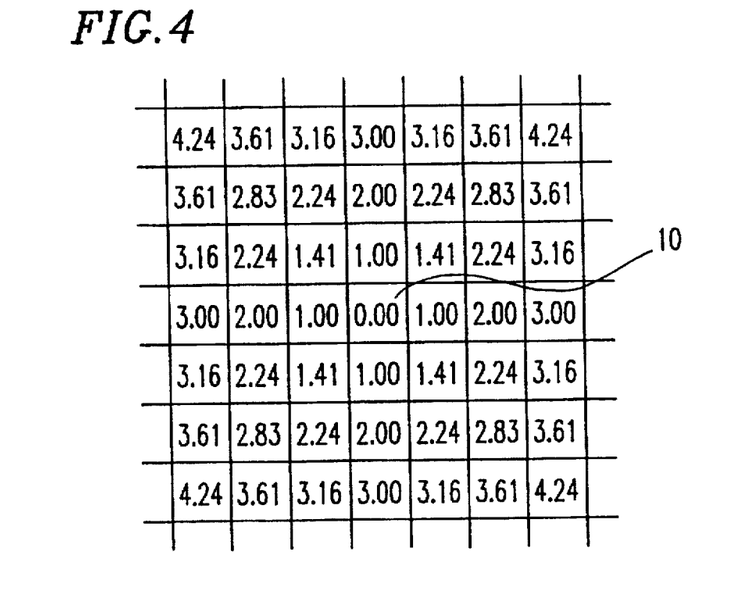
FIG. 4 is a view showing a distance data table stored in the distance storing/calculating section 5.
Figure 5:
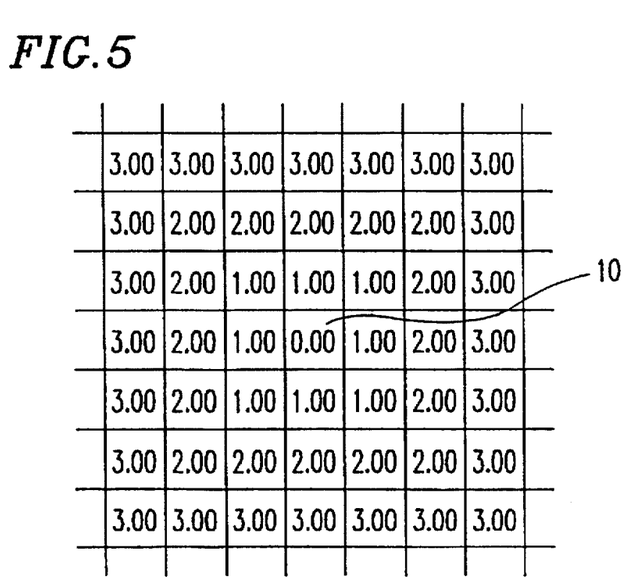
FIG. 5 Is a view showing another distance data table stored in the distance storing/calculating section 5.
Figure 6:
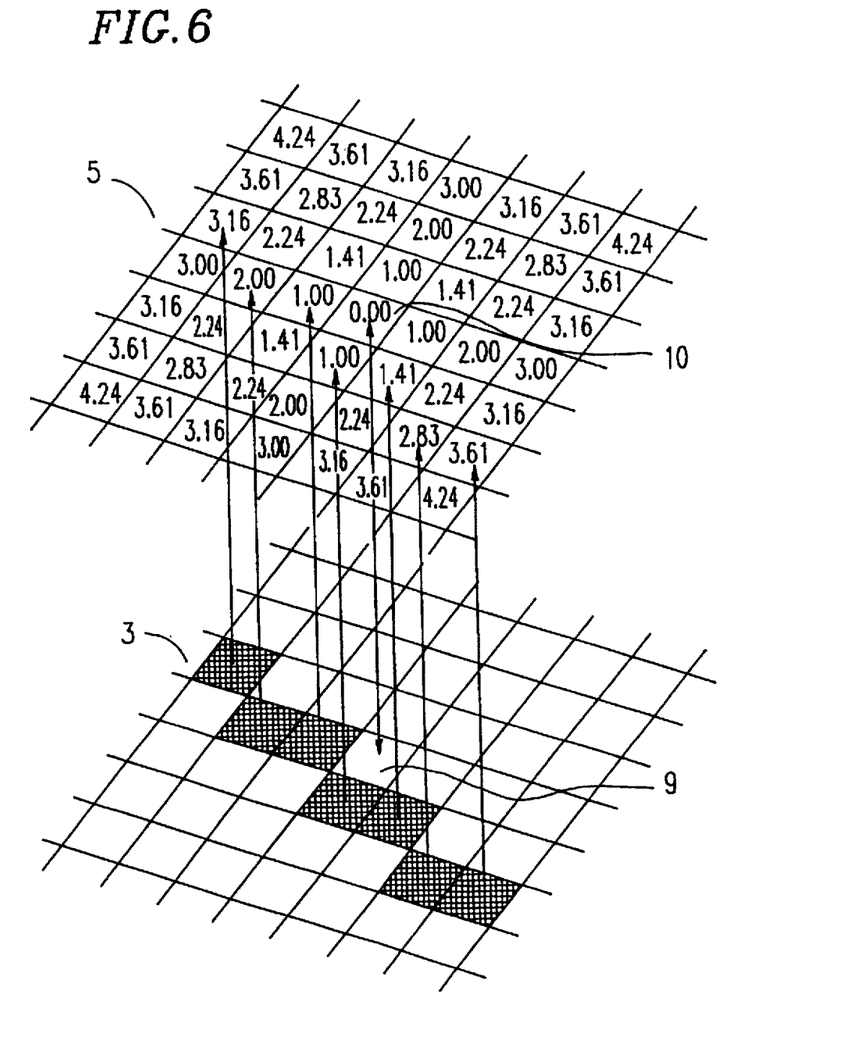
FIG. 6 is a view explaining how to refer to the distance data table.

FIGS. 4 to 6 show an example as to how the distance storing/calculating section 5 obtains a distance from the attention point on the display screen of the display section 3 in Step S3.

FIG. 4 shows an exemplary distance data table stored in the distance storing/calculating section 5. The distance data table has a plurality of elements corresponding to respective display pixels in the display section 3. Each element has a value indicating a distance from the center element 10 which is located at the center of the distance data table. In the example shown in FIG. 4, the distance is defined as a straight distance from the center element 10.

The distance storing/calculating section 5 obtains a distance from the attention point with reference to a value of the element included in the distance data table along with locating the attention point at the center element 10.

FIG. 5 shows an another exemplary distance data table stored in the distance storing/calculating section 5.

The definition of the distance from the center element 10 in the distance date table shown in FIG. 5 is different from that of the distance from the center element 10 in the distance data table shown in FIG. 4. Specifically, in the example shown in FIG. 5, the distance is defined based on the most outer boundary of a square centered on the center element 10 rather then a straight distance from the center element 10. The elements have the identical distance if the elements are located at the identical outer boundary of the identical square centered on the center element 10.

FIG. 6 shows an example as to how the distance storing/ calculating section 5 refers the distance data table shown in FIG. 4 and FIG. 5. The distance storing/calculating section 5 locates the center element 10 of the distance date table at the attention point 9 on the display screen of the display section 3, and refers to a value of the element of the distance data table corresponding to the display pixel on the display screen of the display section 3,. so as to obtain a distance between the attention point 9 and the display pixel.

Alternatively, the distance storing/calculating section 5 may calculate the distance from the attention point for each display pixel on the display screen of the display section 3. The distance storing/calculating section 5 may calculate the distance from the attention point only for an end point of a straight line, and obtain the distance from the attention point by making an interpolating calculation for each display pixel on the intermediate portion of the straight line.

Next, an example as to how the display color calculating section 6 calculates a color in which the map information is displayed in step S4 will be described.

The display color calculating section 6 stores different colors for respective types of the map information. The display color calculating section 6 calculates a display color using the importance degree of the map information obtained by the importance degree storing/calculating section 2 and the distance from the attention point obtained by the distance storing/calculating section 5 in accordance with the following expression:

$$R = aR_0 + (1-a)R_b$$

$$G = aG_0 + (1-a)G_b$$

$$B = aG_0 + (1-a)B_b$$

$$a = k \times I \times (D_{max} - D_{min})$$

where $a = 1.0$ if $a > 1.0$, and $a = 0.0$ if $a < 0.0$.

In the expression, R denotes the strength of red component of the display color; G denotes the strength of green component of the display color; B denotes the strength of blue component of the display color; $R_0$ denotes the strength of red component of the display color stored depending on the type of the map information; $G_0$ denotes the strength of green component of the display color stored depending-on the type of the map information; $B_0$ denotes the strength of blue component of the display color stored depending on the type of the map information; $R_b$ denotes the strength of red component of the background of the map; $G_b$ denotes the strength of green component of the background of the map; $B_b$ denotes the strength of blue component of the background of the map; I denotes the importance degree of the map information obtained by the importance degree storing/calculating section 2; D denotes the distance from the attention point obtained by the distance storing/calculating section 5; $D_{max}$ denotes a maximum distance for displaying map information; and $D_{min}$ denotes a minimum distance for making Influence to the display color; and k denotes a fixed coefficient value.

Using the above expression, as the map information has a lower importance degree and has greater distance away from the attention point, the display color calculating section 6 obtains the display color having a higher degree of transparency. Alternatively, the display color may have a higher degree of luminance or higher degree of a particular color component. Thus, the map information having a lower importance degree and greater distance away from the attention point becomes more invisible to the human eyes.

Example 2

Figure 7:
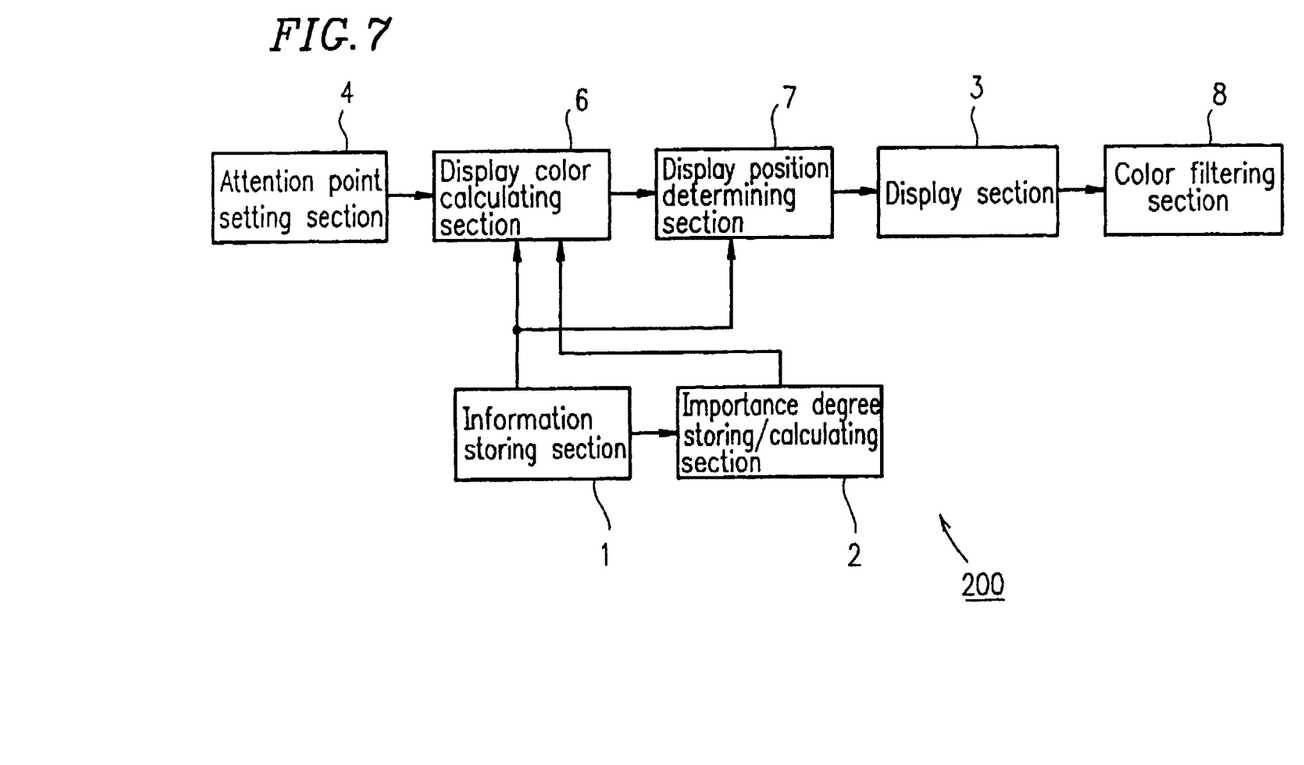
FIG. 7 is a block diagram showing a configuration for an information display apparatus 200 of Example 2 according to the present invention.

FIG. 7 shows the configuration for an information display apparatus 200 for displaying map information of Example 2 according to the present invention.

The information display apparatus 200 includes an information storing section 1; an importance degree storing/calculating section 2; a display section 3; an attention point setting section 4; a display color calculating section 6; a display position determining section 7; and a color filtering section B.

The information storing section 1 stores various map information to be displayed. The output of the information storing section 1 is supplied to the importance degree storing/calculating section 2, the display color calculating section 6 and the display position determining section 7.

The importance degree storing/calculating section 2 calculates an importance degree of map information stored in the information storing section 1. The output of the importance degree storing/calculating section 2 is supplied to the display color calculating section 6.

The display section 3 displays the map information. The display section 3 includes a display device such as a CRT or a liquid crystal display device.

The attention point setting section 4 sets an attention point in a map. For example, the attention point indicates a destination to which a user wants to go. The output of the attention point setting section 4 is supplied to the display color calculating section 6.

The display color calculating section 6 calculates a color for displaying map information stored in the information storing section 1 based on the importance degree of the map information calculated by the importance degree storing/calculating section 2 and the attention point which is set by the attention point setting section 4. The display color calculating section 6 is supplied to the display position determining section 7

The display position determining section 7 determines a position on a display screen of the display section 3 at which the map information stored in the information storing section 1 is to be displayed.

The color filtering section 6 filters (or cuts off) a specified color among the colors displayed on the display screen of the display section 3. For example, the color filtering section 8 is configured by a filter or filters.

Figure 8:
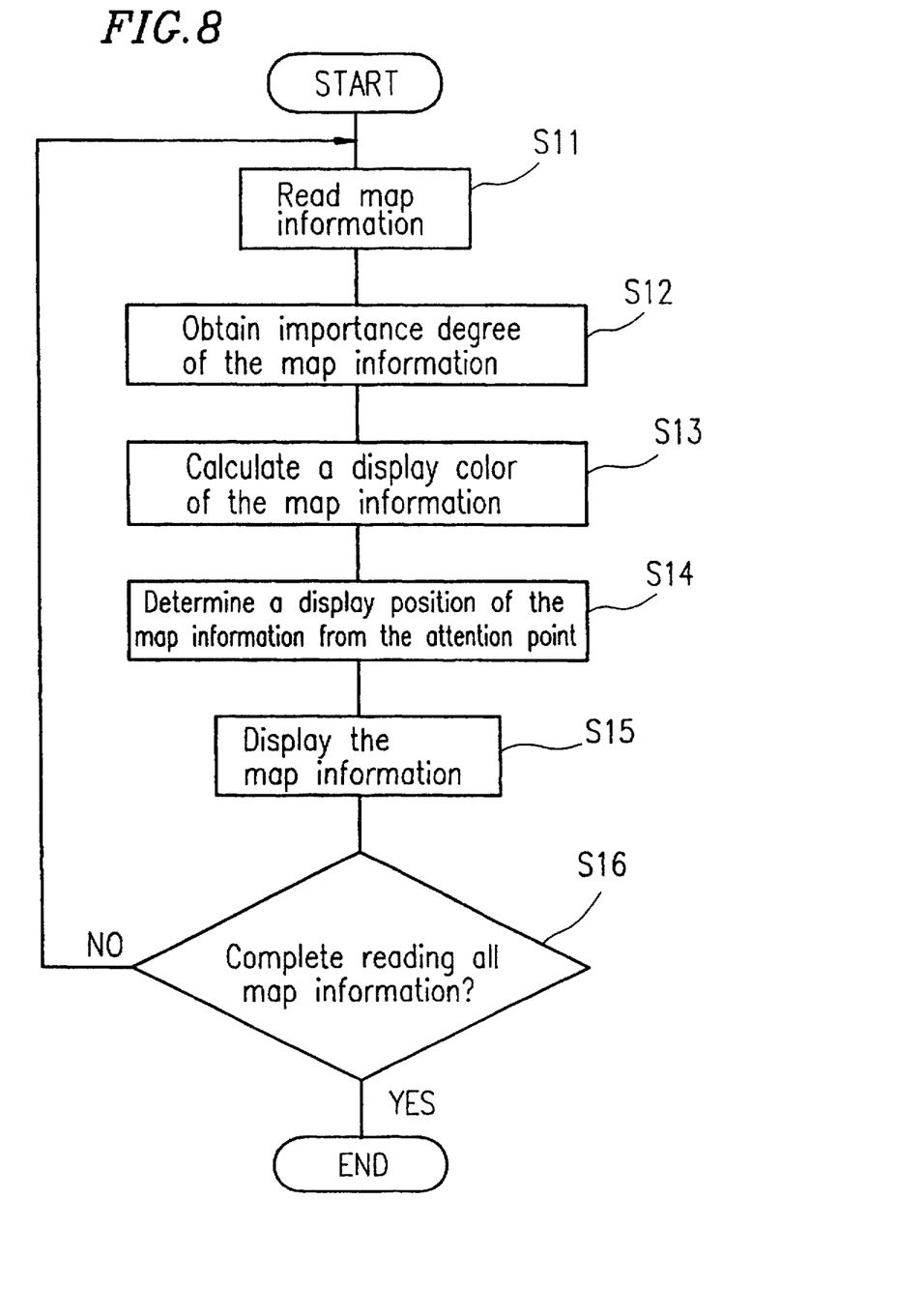
FIG. 8 is a flowchart showing the operation of the information display apparatus 200.

FIG. 8 is a flowchart showing the operation of the information display apparatus 200.

The information display apparatus 200 reads map information to be displayed from the information storing section 1 (Step S11). Read map information is supplied to the importance degree storing/calculating section 2, the display color calculating section 6 and the display position determining section 7, respectively.

The importance degree storing/calculating section 2 obtains an importance degree of the map information which is read in Step S11, and outputs the importance degree of the map information. to the display color calculating section 6 (Step S12).

The display color calculating section 6 calculates a color for displaying the map information based on the importance degree obtained by the importance degree storing/calculating section 2 and the attention point which is set by the attention point setting section 4, and outputs the calculated color to the display position determining section 7 (Step S13).

The display position determining section 7 determines a position on a display screen of the display section 3 at which the map information read from the information storing section 1 is to be displayed (Step S14), and displays the map information on the display screen of the display section 3 in the color calculated by the display color calculating section 6 (Step S15).

The process of Step S11 through Step S15 is repeatedly made for all map information (Step S16).

Thus, individual pieces of information are displayed on the display screen of the display section 3 with colors which may differ depending on the importance degree and the attention point.

FIGS. 9 to 12 show an example as to how the color filtering section 8 filters a specified color.

Figure 9:
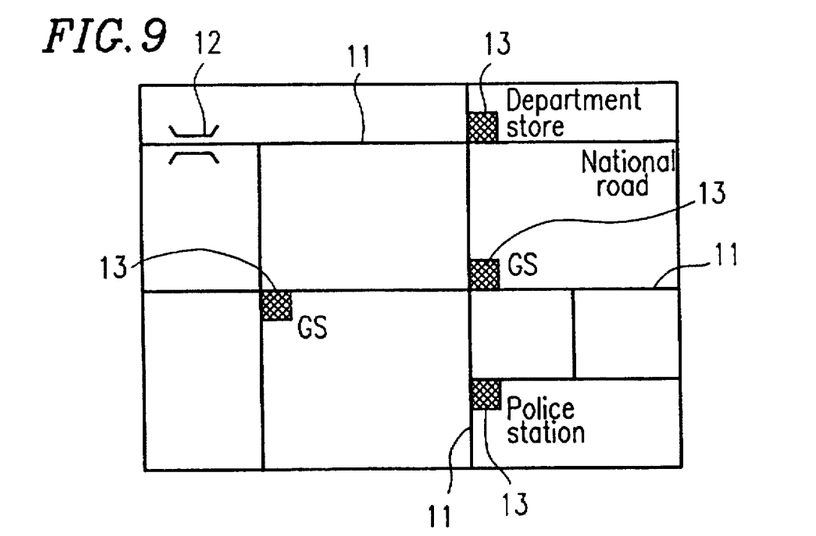
FIG. 9 is a view showing map information displayed on the display screen of the display section 3.

FIG. 9 shows an exemplary map information displayed on the display screen of the display section 3. In an example shown in FIG. 9, a national road 11, bridge 12 and landmark 13 have high importance degrees, respectively, and therefore, are displayed in a color different from the color of other map information.

Figure 10:
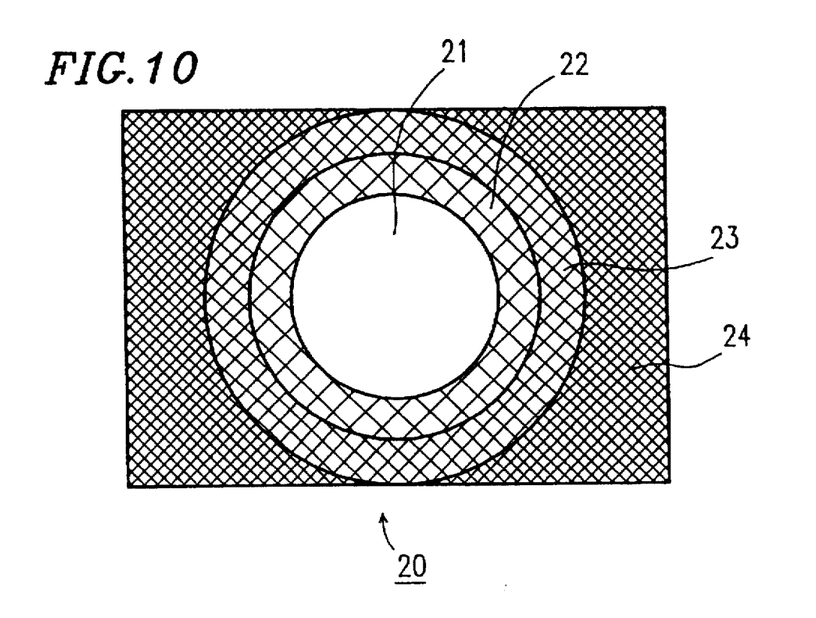
FIG. 10 is a view showing a structure for a filter 20 as the color filtering section 8.

FIG. 10 shows an exemplary filter 20 which serves as the color filtering section 6. The filter shown 20 includes a plurality of regions 21 to 24 which are partitioned by concentric circles with particular widths. The regions 21 to 24 have different colors with respect to each other.

The regions 21 to 24 are arranged so that a peripheral portion of the filter 20 more strongly filters a specified color among colors displayed on the display screen of the display section 3 compared to a central portion of the filter 20. The more peripheral portion of the filter 20 more strongly filters the specified color. The specified color is the same color which is used to display the map information having a low importance degree. The attention point is located at the center of the filter 20.

Thus, the map information having a lower importance degree becomes more invisible to the human eyes in a peripheral portion of display screen of display section 3.

Figure 11:
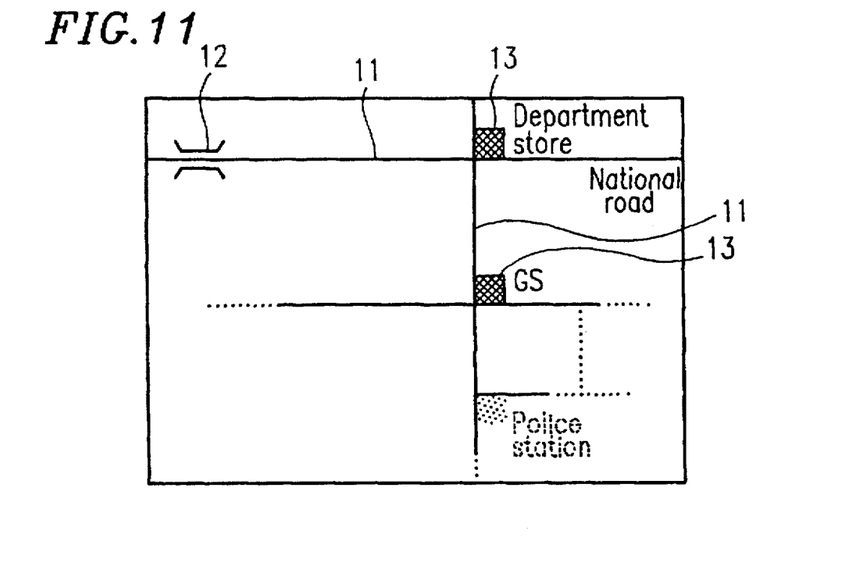
FIG. 11 is a view showing map information which is presented to a user by filtering the map Information displayed on the display screen using the color filtering section 8.

FIG. 11 shows a result obtained by filtering map information shown in FIG. 9 using the filter 20 shown in FIG. 10. The result is provided with the user.

In FIG. 11, it is assumed that the attention point is located at a gas station (G5) 13 on a center portion of the display screen. Since a national road 11, bridge 12 and landmark 13 have high importance degrees, respectively, these pieces of map information are displayed clearly even if these pieces of map information are located in a peripheral portion, which is located far away from the attention point. On the other hand, the map information having a low importance degree is displayed clearly only In a vicinity of the attention point.

Figure 12:
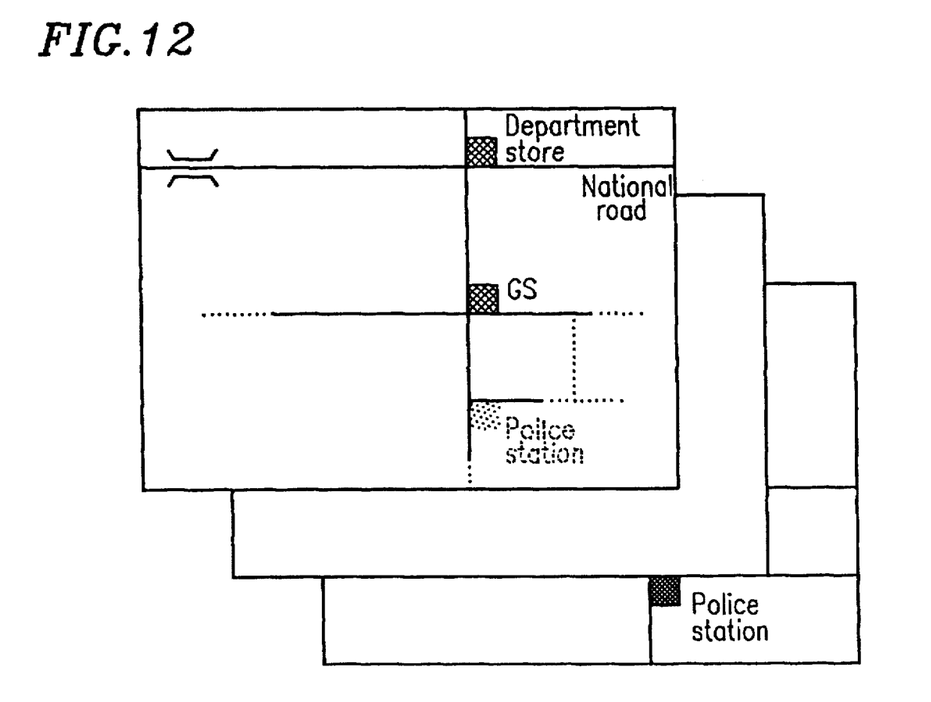
FIG. 12 is a view showing an arrangement of the display screen of the display section 3 shown in FIG. 9, the filter 20 shown in FIG. 10 and the filtered result which is presented to the user shown In FIG. 11.

FIG. 12 shows an arrangement of the display screen of the display section 3 shown in FIG. 9, the filter 20 shown in FIG. 10 and the filtered result which is provided to the user shown in FIG. 11. In FIG. 12, the lower plane represents the display screen of the display section 3 shown in FIG. 9, the intermediate plane represents the filter 20 shown in FIG. 10 and the upper plane represents the filtered result which is provided to the user shown in FIG. 11.

In the examples described above, the present invention may be applied to an apparatus for displaying map information. However, the present invention is not limited to this application. The present invention can he also applied to an apparatus for displaying more general information.

According to the present invention, the map information located inside a vicinity of the attention point is displayed with a color which the user can easily recognize. As the map information is located farther away from the attention point, the map information is displayed in a color which the user can less easily recognize. This means that the vicinity of the attention point is emphasized with colors. As a result, the user can easily identify and obtain necessary information among the displayed various information.

Further, without increasing an amount of processing in the apparatus, a region to which the user pays attention can be displayed in detail. The information display apparatus according to the present invention provides the display screen in which the user can easily understand the relationship to the information as a whole.

By adopting a color similar to a background color as the color for displaying map information having a low importance degree which is located away far from the attention p6int, the map information having a lower importance degree and located farther away from the attention point becomes more invisible to the human eyes.

In one embodiment, as map information has a higher importance degree, the map information may be displayed in a color including an increased amount of red component. As map information has a lower importance degree, the map information is displayed in a color including an increased amount of green component. By filtering more green component in the peripheral portion compared to the central portion of the display screen, the map information having a lower importance degree becomes more invisible to the human eyes in the peripheral portion of the display screen.

Various other modifications will be apparent to and can be readily, made by those skilled in the art without departing from the scope and spirit of this invention. Accordingly, it is not intended that the scope of the claims appended hereto be limited to the description as set forth herein, but rather that the claims be broadly construed.

What is claimed is:

1. An information display apparatus comprising:

information storing means for storing information to be displayed;

display means for displaying the information on a display screen;

attention point setting means for setting an attention point defining a specified point to which a user desires to direct attention on the display screen;

importance degree calculating means for calculating an importance degree of the information;

display color changing means for changing a color in which the information is displayed on the display screen in accordance with the importance degree of the information calculated by the importance degree calculating means and a distance between the information and the attention point set by the attention point setting means.

2. An information display apparatus according to claim 1, wherein the display color changing means changes the color such that the information having a lower importance degree is displayed in a more invisible manner and the information which is located farther away from the attention point is displayed in a more invisible manner.

3. An information display apparatus according to claim 1, wherein the display color changing means includes distance calculating means for calculating a distance between the information and the attention point using a distance data table, and wherein the distance data table includes a plurality of elements each having a value indicating a distance from a center element which is located at the center of the distance data table.

4. An information display apparatus according to claim 3, wherein the distance calculating means calculates the distance with reference to a value of the element included in the distance data table with locating the attention point at the center element.

5. An information display apparatus according to claim 1, wherein the display color changing means includes color filtering means for filtering a specified color among colors displayed on the display screen.

6. An information display apparatus according to claim 5, wherein the color filtering means includes a central portion and a peripheral portion, the peripheral portion of the color filtering means more strongly filters the specified color compared to the central portion of the color filtering means.

* * * * *